United States Patent [19]

Kleeberg et al.

[11] 4,304,570
[45] Dec. 8, 1981

[54] METHOD OF SEPARATION OF SULFUR FROM A SCRUBBING LIQUID

[75] Inventors: Ulrich Kleeberg, Mulheim an der Ruhr; Werner Stehning, Dorsten, both of Fed. Rep. of Germany

[73] Assignee: Gottfried Bischoff Bau Kompl. Gasreinigungs- und Wasserrückkühlanlagen Gmbh & Co. KG., Essen, Fed. Rep. of Germany

[21] Appl. No.: 120,106

[22] Filed: Feb. 8, 1980

[30] Foreign Application Priority Data

Feb. 9, 1979 [DE] Fed. Rep. of Germany ....... 2904845

[51] Int. Cl.³ .................. B01D 17/02; B01D 43/00
[52] U.S. Cl. ................... 23/293 S; 23/308 S; 210/114; 210/115; 210/773; 210/774
[58] Field of Search ............ 23/293 S, 308 S; 210/72, 84, 114, 115, 120, 180, 187, 242 S, 532 R, 533, 538, DIG. 26, 23 R, 773, 774; 423/567 R, 567 A, 578 R; 422/243

[56] References Cited

U.S. PATENT DOCUMENTS

| 1,763,762 | 6/1930 | Crowley | 23/308 S |
| 2,826,306 | 3/1958 | Burns | 210/115 X |
| 2,984,360 | 5/1961 | Smith | 210/114 X |
| 3,804,252 | 4/1974 | Rishel | 210/84 |
| 3,971,719 | 7/1976 | Peters | 210/114 X |
| 4,059,517 | 11/1977 | Strahorn et al. | 210/84 X |
| 4,111,805 | 9/1978 | Pool et al. | 210/532 R X |

FOREIGN PATENT DOCUMENTS

| 2305293 | 9/1973 | Fed. Rep. of Germany | 423/567 R |
| 952502 | 3/1964 | United Kingdom | 423/578 |

Primary Examiner—Bradley Garris
Attorney, Agent, or Firm—Karl F. Ross

[57] ABSTRACT

A suspension of sulfur in a scrubbing liquid is preheated with steam to a temperature above the melting point of the sulfur so that the latter spontaneously melts in the suspension which is introduced into a separating chamber in a sealed vessel. The scrubbing liquid is decanted over a weir into a second chamber while the molten sulfur is drawn out at the bottom into a third chamber. The separating chamber is maintained at a pressure and temperature, by a vapor cushion above the liquid, such that evaporation of the incoming liquid does not occur, i.e. the separation pressure is the saturation pressure of the cushion. To prevent vapor condensation on the molten sulfur, the latter is maintained at a temperature higher than that of the liquid in the adjacent separating chamber.

4 Claims, 2 Drawing Figures

METHOD OF SEPARATION OF SULFUR FROM A SCRUBBING LIQUID

FIELD OF THE INVENTION

Our present invention relates to a method of continuous separation of sulfur from a scrubbing liquid in which the sulfur is suspended, especially a suspension of a so-called Stretford scrubbing liquid in which sulfur is dispersed or entrained.

BACKGROUND OF THE INVENTION

In the cleaning of industrial waste gases it is frequently desirable, and in most cases a requirement of the law, that hydrogen sulfide be scrubbed from the combustion gases. The scrubbing of hydrogen sulfide from the combustion gases can be effected with a so-called Stretford scrubbing liquid which generally consists of an aqueous sodium carbonate solution which can include anthroquinone disulfonic acid and sodium vanadate.

In this process, the solubilized or dissolved hydrogen sulfide is oxidized to elemental sulfur which is dispersed, suspended or flotated in the scrubbing liquid.

The sulfur/scrubbing-liquid suspension with which the present invention is concerned thus can be a suspension in the liquid involved in the Stretford process, although the invention is also applicable to sulfur/water suspensions, regardless of how derived, whether from gas treatment or cleaning or otherwise, and containing elemental sulfur dispersed or entrained in finely divided form in an aqueous liquid.

It is known to separate sulfur/liquid suspensions, e.g. a sulfur suspension in the Stretford scrubbing liquid, by raising the temperature of the suspension to a level above the melting point of the sulfur and to introduce the heated suspension into a heated separating vessel which can be under pressure and designed to permit the settled layer of liquid sulfur to be withdrawn from the bottom while the scrubbing liquid, riding above the sulfur layer, is continuously decanted from the vessel.

It should be understood that the feed of the suspension into the separating vessel and the rheological conditions therein must be established in such a way as to enable the continuous decantation of the aqueous phase, i.e. to allow the decantation process to remain undisturbed by turbulence and flow-direction changes.

In the conventional process the suspension, whose sulfur particles have usually already been melted, is continuously forced into the vessel which is completely filled with the liquid so as to be free from any air cushion in a space above the liquid. The separating vessel is a cylindrical upright receptacle and the suspension is generally introduced at a central region thereof with the scrubbing liquid or aqueous phase being withdrawn from the head while the liquid sulfur is withdrawn from and/or accumulates at the base or sump of the vessel.

Naturally, valves are provided in this system for controlling the feed of the suspension, the withdrawal of the aqueous phase and the removal of the sulfur.

In the conventional process, moreover, the highest possible temperature is maintained in the vessel, as is determined by the separating pressure in the vessel.

Experience with this earlier system, however, has shown that it is is not free from disadvantages of which the most significant is the presence of sulfur in the decanted scrubbing liquid. This of course signifies that the separation is incomplete.

Since the scrubbing liquid generally derives from and is recirculated in a plant for the treatment or cleaning of industrial waste gases, stoppages in the duct system between the separating vessel and the gas-cleaning scrubber may result from accumulations of sulfur in the system.

To prevent the entrainment of sulfur with the scrubbing liquid withdrawn from a separating vessel, it is common practice to provide the upper portion of this vessel with flow-directing and direction-changing baffles or like elements, generally of ring configuration.

The effect of these devices is not fully satisfactory since the problem, in large measure, remains and any reduction in the sulfur entrainment appears to be tied to a reduction in the throughput of the separating vessel, this being a significant economic disadvantage.

OBJECTS OF THE INVENTION

It is the principal object of the present invention to provide an improved method of separating sulfur from a sulfur/liquid suspension whereby the disadvantages of the earlier system are avoided and the liquid phase can be withdrawn and recirculated without the stoppage dangers previously described.

Another object of this invention is to provide a method of more completely separating sulfur from a scrubbing liquid, preferably a Stretford solution, whereby the liquid can be recirculated practically free from entrained sulfur.

Yet another object of our invention is to provide a separating method of the type described with improved efficiency and throughput.

SUMMARY OF THE INVENTION

These objects and others which will become apparent hereinafter are attained in accordance with the present invention by maintaining the temperature of the suspension before it enters the separating vessel and thereafter at a level which lies above the melting point of the sulfur while a steam or vapor cushion is maintained in an air space of the separating vessel above the suspension and is held at a pressure above the saturation pressure corresponding to the temperature of the heated incoming suspension, the scrubbing liquid being decanted via an overflow.

The separating temperature, in accordance with the present invention, is held constant, e.g. by simply controlling the temperature of the suspension by feeding steam into the overlying vapor space at saturation temperature. The vapor cushion above the suspension consists predominantly of solvent vapors or steam.

The invention is based upon our discovery that the disadvantages of earlier systems derive in part from the lack of accurate control of pressure and temperature in the separating vessel because of an entirely different approach to the separating process. Earlier processes neglected thermodynamic considerations and were dominated by mechanical or hydrodynamic processes or parameters.

Thus, while the decantation process in the separating vessel not only involves hydrodynamic considerations which require the absence of turbulence and low flow velocities, there are thermodynamic characteristics which we have found to be highly, indeed critically, significant since effective separation also depends upon the thermodynamic potential which is a function of pressure and temperature.

By providing and maintaining the vapor cushion above the liquid phases in the vessel, it is possible to control the pressure and, in conjunction therewith, also the temperature with great precision.

Furthermore, because a water- or solvent-saturated vapor phase is maintained above the liquid phase, an evaporation of the scrubbing liquid in the separating vessel is excluded, thereby eliminating the detrimental effect of evaporation upon the separation.

With the system of the present invention it is possible to withdraw from the separating vessel a scrubbing liquid which is free from sulfur and which can be recirculated without problems. Furthermore, the separating efficiency is so great that a much higher throughput of the suspension per unit time can be tolerated. Finally, the system of the present invention allows a relatively simple separating vessel to be used.

The separating vessel used for practicing the method of our invention can have, in the usual manner, feed means for the suspension, discharge means for withdrawal of the scrubbing liquid and a discharge means for withdrawal of the molten sulfur, in addition to a heating device for controlling the temperature.

Moreover, the apparatus should be so designed that the suspension feeder opens into a separating chamber which empties via an overflow weir into an adjacent scrubbing-liquid chamber provided with means for withdrawing the scrubbing liquid, e.g. via still another overflow.

A wall of the separating chamber has an outlet close to the bottom thereof which communicates with an adjoining sulfur-collection chamber, likewise formed with an outlet through which the sulfur can be discharged. The chambers are enclosed in a common housing wherein the space above the liquid phases is formed as a steam or vapor compartment which is provided with a pressure control maintaining the pressure in the separating vessel.

The discharge device for the scrubbing liquid, the discharge device for the molten sulfur and the feeder means for the suspension can be provided with the usual control or regulating valves or like means.

The juxtaposed chambers may be separated from one another by partitions formed with the overflow weir and the aforementioned discharge port or outlet.

To avoid the formation of condensate, the sulfur chamber is heated more intensely than the scrubbing-liquid chamber.

BRIEF DESCRIPTION OF THE DRAWING

The above and other features of the present invention will become more readily apparent from the following description, reference being made to the accompanying drawing in which.

SPECIFIC DESCRIPTION

Figure 1:
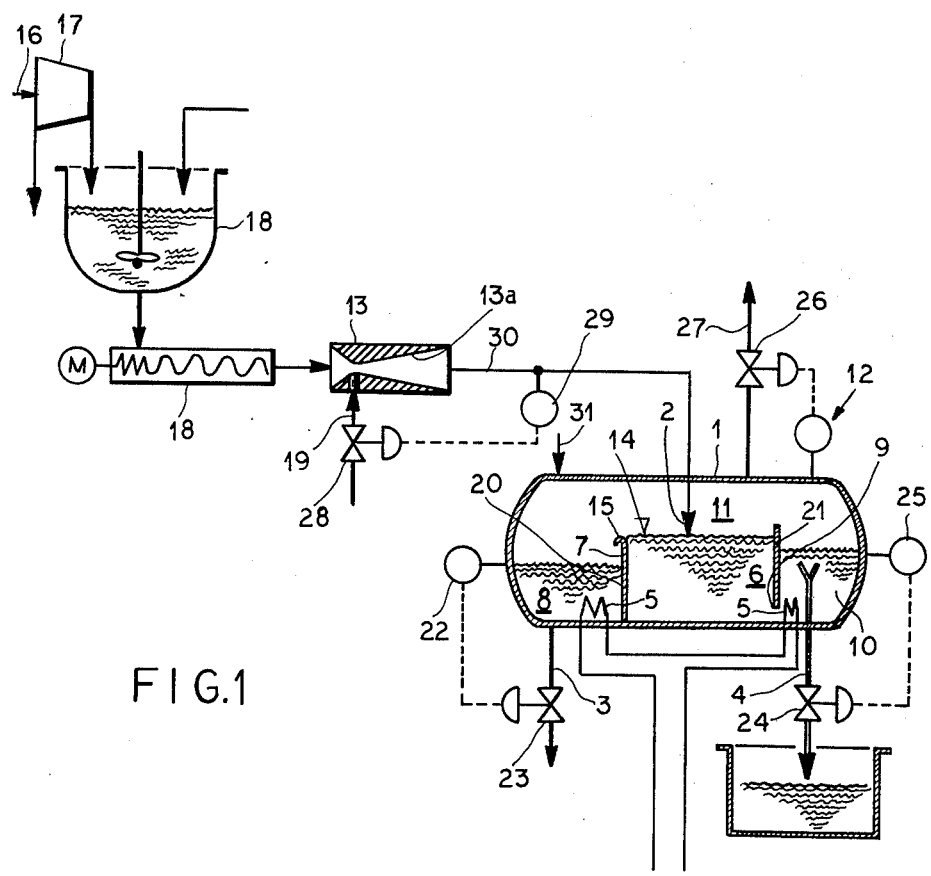
FIG. 1 is a flow diagram through an apparatus for carrying out the invention, as seen in vertical section.

In the drawing we have shown an apparatus for carrying out the method of the invention, partly in diagrammatic form, which comprises a cylindrical pressure vessel 1 with a horizontal axis and with domed ends.

This vessel is provided with a feed means, diagramatically represented at 2, for delivering the suspension of the aqueous scrubbing liquid and sulfur particles. In addition, the vessel is provided with means, shown as a pipe 3, for discharging the scrubbing liquid decanted from the sulfur and with a discharge device 4 for the withdrawal of the liquid sulfur.

Heating means, such as pair of heating coils or tubes through which a heating fluid are circulated, is represented at 5 and the coils can be seen to be immersed in the scrubbing liquid and in the molten sulfur contained within the vessel.

The feeder 2 opens into a separating chamber 6 which is formed by a pair of partition walls 20,21, the former being provided with an overflow weir 7 over whose lip 15 the scrubbing liquid is decanted into an adjoining chamber 8 provided with the pipe 3 for discharging the scrubbing liquid. A level sensor 22, mounted on the end wall of chamber 8, responds to the level of the scrubbing liquid therein and controls a valve 23 connected to pipe 3 so as to maintain a desired fluid level by draining off the excess of the scrubbing liquid.

On its opposite side, the wall 21 is provided with an outlet passage 9 close to its bottom whereby sulfur can pass beneath the wall 21 into a collection chamber 10 from which the sulfur is drained by the pipe 4 at a rate controlled by a valve 24 which is opened and closed by a sulfur-level controller 25.

The air spaces above the liquids in chambers 6, 8 and 10 communicate with one another and form a steam or vapor space 11 which is provided with a pressure sensor 12 controlling a valve 26 in a pipe 27 for venting the space 11 to the atmosphere. The pressure controller 12 thus establishes the separating pressure in space 11.

The separating pressure is maintained sufficiently high so that the heaters and sulfur-melting devices do not permit evaporation of the liquid phases in the vessel 1.

In the separating vessel 1, the sulfur/scrubbing-liquid suspension is continuously separated by allowing the droplets of molten sulfur to settle and be withdrawn through outlet 9 while the supernatant scrubbing liquid from which the sulfur has settled passes over the weir 7.

According to the invention, moreover, the original suspension of solid sulfur particles in the aqueous phase is heated by a heat exchanger 13 to a temperature at which sulfur forms a saturated solution in the scrubbing liquid. The heat exchanger is here shown to have a Venturi nozzle 13a which can form an ejector to which steam can be fed via a pipe 19 under the control of a valve 28 responsive to a temperature sensor 29 in the line 30 connecting the heat exchanger 13 with the feed pipe 2.

Figure 2:
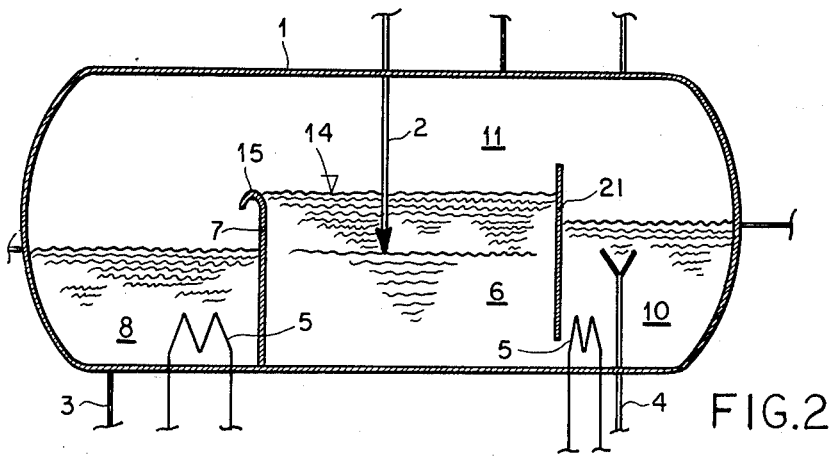
FIG. 2 is a detail view of a separating vessel shown in FIG. 1, likewise seen in axial section.

The heated suspension, in which the sulfur particles have been melted, is introduced into the vessel 1 below the level of liquid in the separating chamber 6 (see FIG. 2), the suspension being thereupon subjected to the separating pressure. The temperature of the suspension is raised in this vessel to a point so chosen with reference to the separating pressure that no evaporation will occur.

Within the separating vessel 1, above the liquid level 14, a vapor or steam cushion is developed and mantained which, in turn, controls the separating pressure with precision while the scrubbing liquid is decanted over the lip 15 of the weir.

In operation, the Stretford scrubbing liquid is fed at 16 to a conventional thickener 17 in which the scrubbing liquid is partially dewatered with one phase being recirculated to the scrubbing operation while the suspension, containing solid sulfur particles dispersed in an aqueous phase, is introduced into a treatment vessel 18 in which it is agitated with steam condensate or water from another source. The sulfur has a particle size of up to about 200 microns.

Using an eccentric worm pump 18, the suspension is fed to the steam-ejector heat exchanger 13 at a pressure of about 3-4 bars as developed by the pump.

The resulting molten-sulfur temperature lies below the saturation temperature corresponding to the vapor pressure in space 11. This has been shown to prevent subsequent evaporation as the suspension is introduced into the vessel 1. The solid particles of sulfur entrained in the scrubbing liquid melt instantaneously and a three-phase process is carried out in the vessel 1 since the scrubbing liquid, molten sulfur and vapor cushion form three phases maintained in substantially steady-state relationship. The feeder 2 can be provided with a distributor for discharging the suspension uniformly over the entire cross-section of the chamber 6 with a minimum of turbulence.

Because of the higher specific gravity (1.8) of the molten sulfur the latter collects at the bottom and the scrubbing liquid, separated from the sulfur, is discharged over the lip 15 of the weir 7 and is removed from the chamber 8.

Sulfur is withdrawn from the chamber 10. The temperature in the sulfur chamber 10 is maintained somewhat higher than that in chamber 8, to avoid steam condensation on the surface of the sulfur.

To avoid any vapor formation in the boundary layer between the two liquids in chamber 6, and hence to avoid turbulence, the vapor cushion in space 11 is maintained at a pressure above the saturation pressure corresponding to the temperature of the incoming scrubbing liquid downstream from the heat exchanger 13 (for example, at 300-400 KP absolute).

This can be accomplished by generating steam in the chamber 8, utilizing indirect heat exchange in the corresponding heater 5, or by introducing steam directly (line 31).

The pressure controller maintains the receptacle pressure constant and simultaneously vents excess gas, for example, carbon dioxide.

Because of the large vapor cushion maintained above the liquid phase, excellent pressure regulation is possible.

Floating sulfur droplets containing air inclusions and flotated solid sulfur can be collected and agglomerated with the aid of baffle plates. In the example given above, in large-scale operation, a separation of more than 99.9% of the sulfur was obtained with a residence time of 3 minutes.

We claim:

1. A method of continuously separating sulfur particles from an aqueous liquid in which they are suspended, comprising the steps of:
   (a) heating the suspension of sulfur in said liquid to a temperature above the melting point of the sulfur;
   (b) continuously introducing the heated suspension into a first chamber of a closed vessel flanked by a second and a third chamber, said chambers being overlain in said vessel by a common air space;
   (c) maintaining a vapor cushion in said air space under a pressure above the saturation pressure corresponding to the temperature of the incoming suspension for preventing evaporation of said aqueous liquid in said first chamber;
   (d) allowing molten sulfur from said suspension to settle at the bottom of said first chamber while letting supernatant liquid overflow an intervening partition into said second chamber;
   (e) continuously drawing off the molten sulfur from said first chamber into said third chamber through a bottom outlet in an intervening partition;
   (f) maintaining the sulfur in said third chamber at a temperature higher than that of the liquid in said second chamber to avoid vapor condensation on the sulfur; and
   (g) withdrawing the liquid and the sulfur from said second and third chambers, respectively.

2. The method defined in claim 1 wherein said vapor cushion is maintained in step (c) by the introduction of steam into said air space.

3. The method defined in claim 2 wherein the steam is introduced substantially at the temperature of saturation established by the pressure prevailing in said vessel.

4. The method defined in claim 1, 2 or 3 wherein said suspension is heated in step (a) by passing through a steam ejector.

* * * * *